United States Patent [19]

Porter

[11] 4,047,686
[45] Sept. 13, 1977

[54] MOUNTING BRACKET FOR RADIOS IN VEHICLES
[76] Inventor: David Edward Porter, 2342 Nesbitt Drive NE., Atlanta, Ga. 30319
[21] Appl. No.: 756,091
[22] Filed: Jan. 3, 1977
[51] Int. Cl.² .............................................. A47B 96/06
[52] U.S. Cl. ........................................ 248/203; 70/58; 70/258; 224/42.45 R
[58] Field of Search .................... 70/57, 58, 232, 237, 70/258; 224/42.45 R; 248/203

[56] References Cited
U.S. PATENT DOCUMENTS

| 3,370,446 | 2/1968 | Francis | 248/203 X |
| 3,410,122 | 11/1968 | Moses | 70/58 |
| 3,563,070 | 2/1971 | Earl | 70/232 |
| 3,595,041 | 7/1971 | Leeper | 248/203 X |
| 3,766,759 | 10/1973 | Artner | 70/58 |
| 3,822,049 | 7/1974 | Saunders | 248/203 |
| 3,993,278 | 11/1976 | Race | 248/203 |

Primary Examiner—James C. Mitchell
Attorney, Agent, or Firm—Newton, Hopkins & Ormsby

[57] ABSTRACT

A bracket structure for permanently mounting a CB radio on a vehicle instrument panel includes primary locking means and secondary concealed locking means so that the mounting is exceptionally secure against radio theft. The bracket structure is attachable to virtually all vehicles and is adjustable to accept most citizens band radios on the market. It features simplicity and strength of construction and ease of installation and adjustment.

7 Claims, 9 Drawing Figures

MOUNTING BRACKET FOR RADIOS IN VEHICLES

BACKGROUND OF THE INVENTION

A variety of anti-theft mounting and locking devices for radios in vehicles are known. Examples of the patented prior art are shown in U.S. Pat. Nos. 3,822,049; 3,766,759; 3,410,122; 3,595,041 and others.

Recognized deficiencies of the prior art devices include complexity of construction and therefore excessive cost, and non-adaptability to a variety of vehicles and commerial radios. In terms of CB radios having hand mikes, the prior art mounting devices frequently make no provision or clearance for microphone jacks.

The objective of the present invention is to completely solve these and other problems in the prior art by provision of a much more universal permanent mounting and locking means for CB radios in vehicles, with full provision and clearance for side microphone jacks on the radio. Additionally, the invention features adequate strength and a clean cut appearance for the mounting means in the overall, plus very secure anti-theft locking means including a primary padlocking arrangement and a concealed back-up or secondary locking arrangement.

Other features and advantages of the invention over the prior art will become apparent during the course of the following detailed description.

SUMMARY OF THE INVENTION

Basically, the invention comprises a pair of laterally adjustable opposing sturdy angle brackets attachable through their top webs to a common flat mounting plate which in turn is secured to a horizontal wall of the overhead vehicle instrument panel in such a way that removal cannot be accomplished from the top of the instrument panel. Dovetail slides firmly anchored to opposite sides of the CB radio are engaged in dovetail grooves provided in the vertical webs of the angle brackets. Concealed arrangement of set screws in the angle mounting brackets locks the slides against longitudinal movement and constitutes a secondary anti-theft locking means. The primary locking means is in the form of forward padlockable slide and angle bracket extensions at the side of the radio connected to the longer of the two angle mounting brackets.

DETAILED DESCRIPTION

Figure 1:
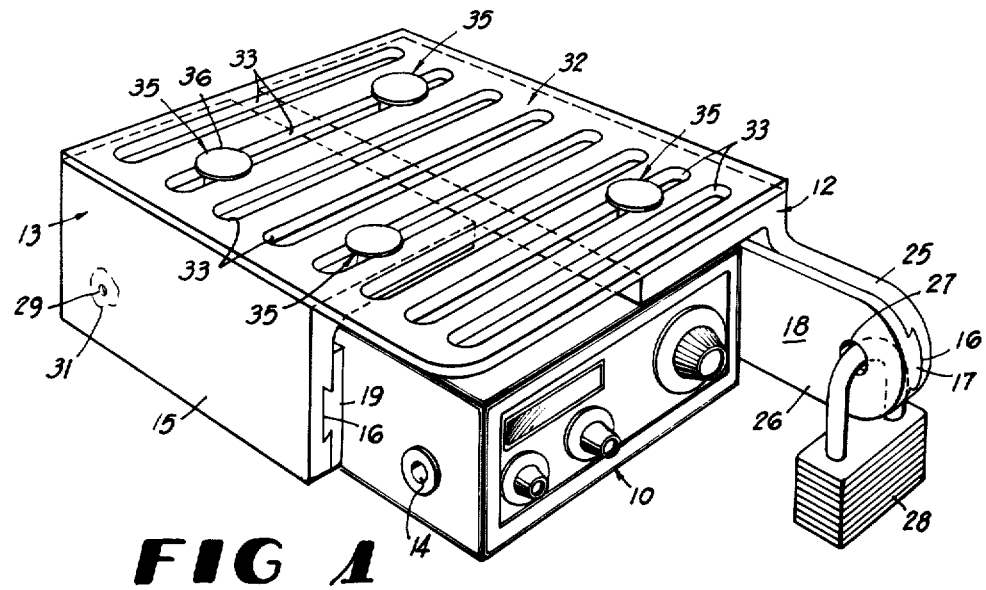
FIG. 1 is a perspective view of a mounting bracket structure and locking means for CB radios in vehicles according to the invention.
Figure 2:
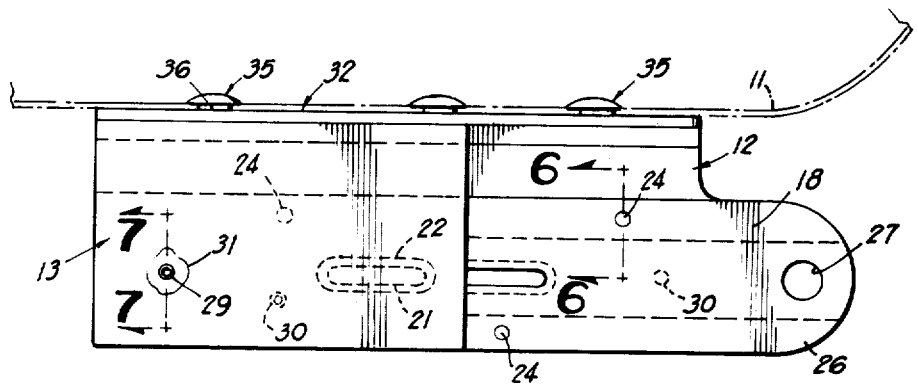
FIG. 2 is a side elevation of the bracket means in FIG. 1 with radio and padlock omitted.

Referring to the drawings in detail wherein like numerals designate like parts, the purpose of the invention in its entirety as illustrated is to form a permanent secure mounting for a CB radio 10 on the under wall 11 of a vehicle instrument panel, truck or automobile. An equally important purpose of the invention is to lock the CB radio against theft from the mounting means and vehicle unless the radio is destroyed beyond repair.

In connection with the above, a pair of laterally adjustable opposing sturdy angle brackets 12 and 13 are provided, the bracket 12 being considerably longer than the bracket 11 to facilitate a padlocking arrangement forwardly of the radio 10, and the shortened angle bracket 13 allowing full clearance and access to a hand miscrophone jack 14 on one side of the CB radio near its front panel.

Figure 3:
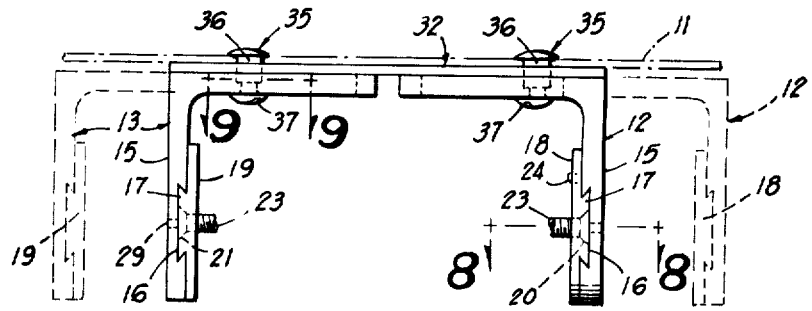
FIG. 3 is an end elevational view of the mounting bracket means depicting its width adjustability in phantom lines and in full lines.
Figure 4:
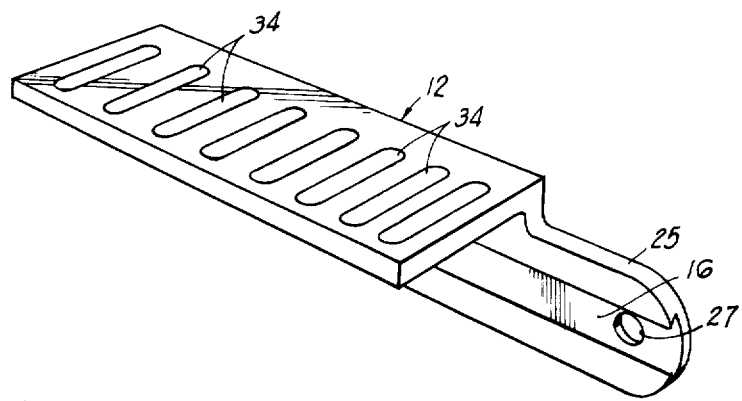
FIG. 4 is a perspective view of a first slotted angle bracket.
Figure 5:
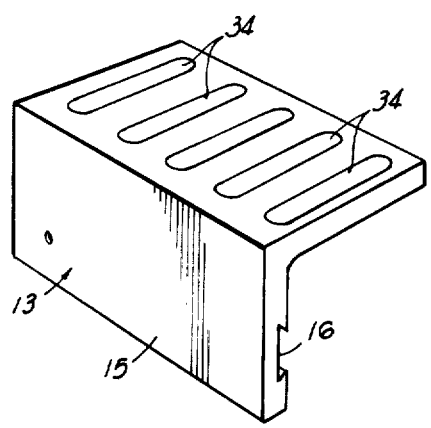
FIG. 5 is a perspective view of a second foreshortened angle bracket.
Figure 6:
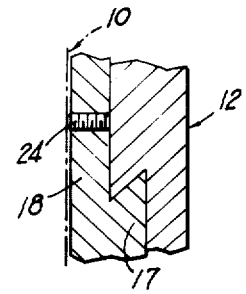
FIG. 6 is a fragmentary vertical section taken on line 6—6 of FIG. 2.
Figure 7:
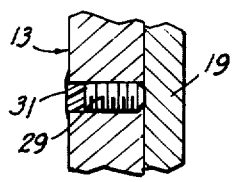
FIG. 7 is a similar section taken on line 7—7 of FIG. 2.
Figure 8:
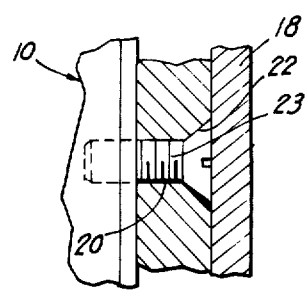
FIG. 8 is a fragmentary horizontal section taken on line 8—8 of FIG. 3.
Figure 9:
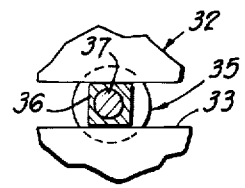
FIG. 9 is a fragmentary horizontal section taken on line 9—9 of FIG. 3.

The vertical webs 15 of angle brackets 12 and 13 are provided on their inner faces and for their entire lengths with continuous longitudinal dovetail grooves 16, which grooves are at the same elevation of the two angle brackets. These grooves accept the dovetail tongues 17 of a pair of slides 18 and 19 which are equal in length to the brackets 12 and 13 on which they are mounted the tongue and groove arrangement. p Each slide 18 and 19 has an elongated slot 20 and 21 formed therein to lie near the fore and aft mid-points of a variety of commercial CB radios. These slots 20 and 21 are countersunk at 22 in the faces of the dovetail tongues 17, FIG. 3, whereby flat headed mounting screws 23 may have their heads placed in the countersunk slots 20 and 21, and with the threaded shanks of the screws 23 securely engaged in threaded openings which are provided in opposite sides of the radio 10. In this manner, the heads of the screws 23 are held captive at the bottom walls of the dovetail grooves 16 and cannot be removed. While the screws are the primary means of attaching slides 18 and 19 to the sides of radio 10, additional means can be used in the form of set screws carried by the slides 18 and 19 to engage the sides of the radio 10 and further stabilize it and secure it frictionally to the two slides. For this purpose, a single set screw 24 could be provided on the shorter slide 19, FIG. 3, while a pair of such set screws 24 may be employed on the longer slide 18.

Forward rounded longitudinal extensions 25 and 26 on the longer angle bracket 12 and slide 18 extend ahead of the radio 10 and are apertured as at 27 to accept the shackle of a padlock 28 or an equivalent primary anti-theft lock. A secondary or back-up locking means is provided in the invention to prevent theft of the radio even if the primary lock is defeated or accidentally left unattached. This secondary locking means is in the form of at least a single set screw 29 on the shorter angle bracket 13 and preferably a pair of like set screws 30 on the longer angle bracket 12, these set screws being randomly located and being concealed at the outer sides of the brackets 12 and 13 by the use of putty 31, FIG. 1, or other similar concealing material. The set screws 29 and 30 carried in the brackets 12 and 13 bear against the two slides 18 and 19 at arbitrary locations and lock the slides against movement on the brackets 12 and 13 quite securely. Since the set screws for this purpose are concealed, as explained, by putty or the like, the thief will be unable to dislodge the radio 10 even if the lock 28 should be broken or if it is not used by the owner at the time of the attempted theft.

A flat overhead mounting plate 32 is employed in conjunction with angle brackets 12 and 13 and this plate has a series of spaced parallel transverse slots 33 formed therethrough which span practically the full width of the plate 32. The plate 32 rests directly on the top webs of angle brackets 12 and 13 and these top webs are similarly provided with transverse slots 34, FIG. 3, in registration with the plate slots 33 whereby various arrangements of fore and aft, as well as lateral, width adjustments of the mounting, can be achieved.

A plurality of two part fasteners 35 is employed to anchor the entire assembly to the bottom of instrument panel wall 11. Each assembly 35 comprises an upper square shank nut 36 which resists rotation in the slot 33 of plate 32 and a mating screw 37 applied from below the brackets 12 and 13, FIG. 3, which are completely inaccessible unless the radio 10 is removed. Four or more of these fastener assemblies 35 distributed as shown in FIG. 1 thus form a very strong and secure means of anchoring the mounting bracket means to the vehicle instrument panel 11 and for securing the angle brackets 12 and 13 firmly to the common mounting plate 32 in selected adjusted positions.

It may now be understood that the invention provides a stable, very secure and permanent type mount for a CB radio in almost any vehicle. Primary and back-up anti-theft locking means are provided and the basic fasteners 35 which attach the assembly to the instrument panel cannot be loosened from above and are inaccessible from below because of the presence of the radio 10. The construction is highly simplified, compact, easy to adjust and install, and comparatively economical to manufacture. Its numerous advantages over the prior art should be apparent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An anti-theft mounting for radios in vehicles comprising a top mounting plate, a pair of spaced opposing angle brackets underlying said mounting plate and having depending side webs, adjustable fastener means securing said angle brackets to said mounting plate for lateral adjustment toward and away from each other and adapted to secure the mounting plate to the bottom of an instrument panel in a vehicle, a pair of bar members adapted for securement to opposite sides of a radio and having interlocking projections on their outer sides, said depending side webs having coacting interlocking recesses receiving said projections, concealed locking means for said bar members on said angle brackets preventing fore and aft displacement of the bar members relative to the angle brackets, said interlocking projections and recesses preventing vertical displacement of the bar members relative to said angle brackets, and forward lockable extensions on one angle bracket and bar member adapted for engagement with a primary locking means.

2. An anti-theft mounting for radios in vehicles as defined in claim 1, and said mounting plate and angle brackets having transverse slots adapted for registration, and said adjustable fastener means comprising square shank fastener elements engageable downwardly through the slots of the mounting plate and restrained from turning by the slots, and coacting fastener elements engaging upwardly within the slots of the angle brackets and having threaded engagement with the square shank fastener elements, the square shank elements having heads adapted to engage on an instrument panel wall for supporting the mounting thereon.

3. An anti-theft mounting for radios in vehicles as defined in claim 1, and said bar members being dovetail members, said depending side webs of the angle brackets having dovetail grooves receiving the dovetail members, said concealed locking means comprising set screws on said angle brackets bearing against the outer faces of the dovetail members.

4. An anti-theft mounting for radios in vehicles as defined in claim 1, and said forward lockable extensions being apertured to receive the shackle of a padlock.

5. An anti-theft mounting for radios in vehicles as defined in claim 1, and said angle brackets being of unequal lengths whereby one angle bracket may extend along the full length of one side of a radio, the opposing angle bracket extending from the back of the radio forwardly to a point rearwardly of the front of the radio whereby a hand microphone jack on one side of the radio is rendered accessible.

6. An anti-theft mounting for radios in vehicles as defined in claim 1, and each bar member having a longitudinal slot formed therethrough in a location near the fore and aft midpoint of a radio to be held by said mounting and said slot being countersunk at the outer side of the bar member whereby flat head screws extending through the slots may secure opposite sides of a radio between said bar members firmly.

7. An anti-theft mounting for radios in vehicles as defined in claim 1, wherein said top mounting plate is a flat plate adapted to lie directly under an instrument panel horizontal wall and having a plurality of parallel slots which are transverse to said angle brackets, the angle brackets including top webs underlying said mounting plate and having a like number of parallel transverse slots, the slots of the angle brackets adapted to register adjustably with ends portions of the slots of the mounting plate, said adjustable fastener means comprising two part separable fasteners engageable through the slots of the mounting plate and angle brackets and including square shank portions which resist rotation in the slots of the mounting plate.

* * * * *